June 17, 1952     I. D. CARDIFF     2,601,092
PICKING AND PRUNING ATTACHMENT TO BE MOUNTED ON TRUCKS
Filed April 28, 1951     3 Sheets-Sheet 1

INVENTOR.
IRA D. CARDIFF
BY
ATTORNEY

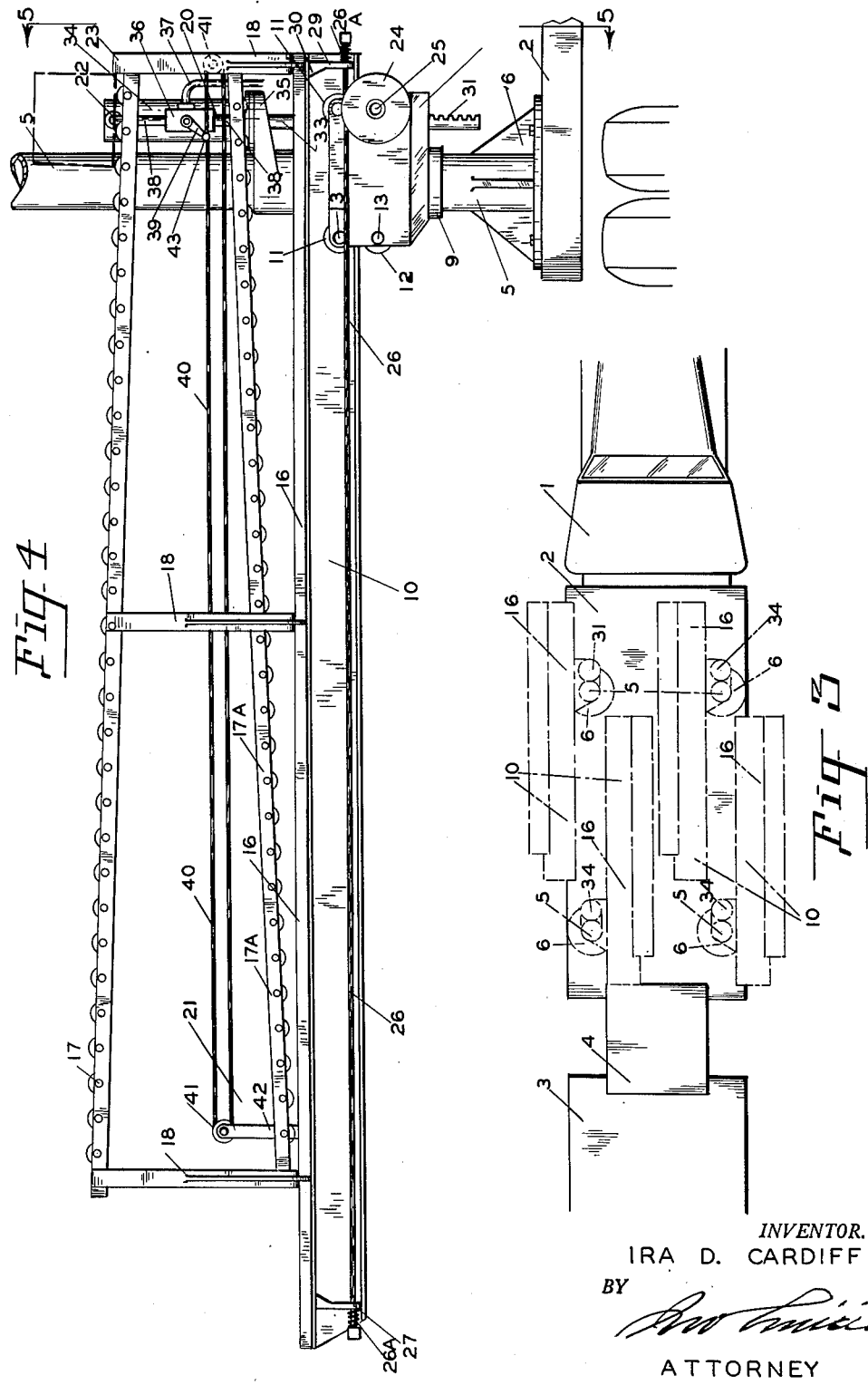

June 17, 1952 — I. D. CARDIFF — 2,601,092
PICKING AND PRUNING ATTACHMENT TO BE MOUNTED ON TRUCKS
Filed April 28, 1951 — 3 Sheets-Sheet 3
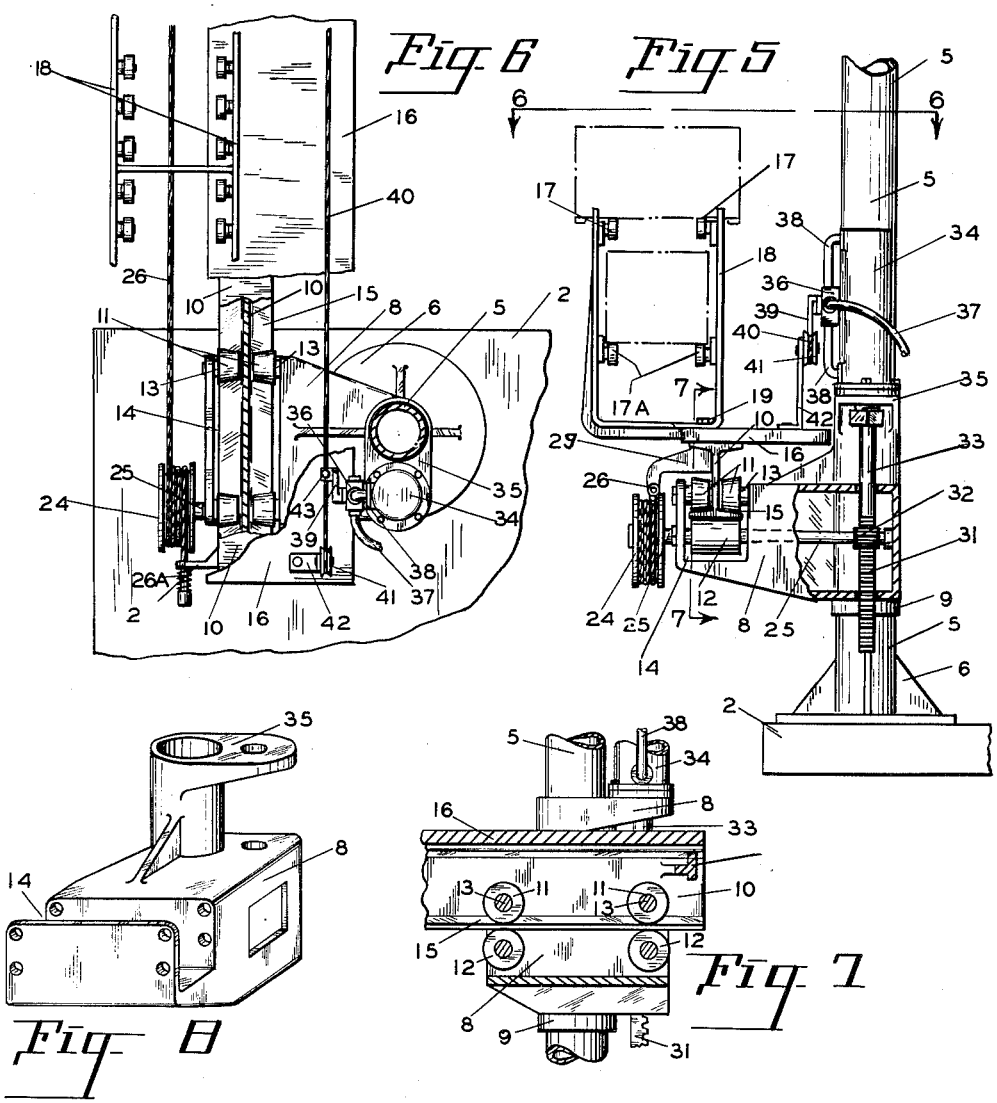
INVENTOR.
IRA D. CARDIFF
BY
ATTORNEY Patented June 17, 1952

2,601,092

UNITED STATES PATENT OFFICE 2,601,092

PICKING AND PRUNING ATTACHMENT TO BE MOUNTED ON TRUCKS

Ira D. Cardiff, Yakima, Wash.

Application April 28, 1951, Serial No. 223,497

4 Claims. (Cl. 214—83.1)

This invention relates to picking and pruning attachments adapted to be mounted on truck beds.

The primary object of this invention is to mount a multiple of platforms on a truck bed upon which pickers stand while picking fruit from fruit trees, said platforms adapted to be extended from the truck into the branches of trees, and adapted to be adjustable laterally relative to the tree while the picker is picking the fruit.

A still further object of the invention is to incorporate conveyors in connection with the platforms so that the empty boxes can be delivered to the picker, and the full boxes delivered from the picker to unloading stations upon the bed of the truck.

In carrying out the above objects, the platforms are movably mounted within supporting brackets, the said supporting brackets being rotatably mounted to pedestals, the said pedestals being supported by the bed of the truck. Means is provided in connection with each platform for moving the same into the branches of the trees from the truck, or moving the same back to the truck from the tree. This moving means being controlled by the picker on the platform.

These and other incidental objects will be apparent in the drawings, specification and claims.

Referring to the drawings:

Figure 1 is a plan view of a truck bed, having my new and improved platforms mounted thereon. This view also shows a partial view of a trailer for receiving the fruits being delivered from the pickers to the truck bed. The location of the trees and branches being generally indicated by broken lines, taken on section line 1—1 of Figure 2 revolved 90 degrees.

Figure 3 is a plan view of the truck and platforms, illustrating the platforms withdrawn from the trees and rotated to a position over the bed of the truck for moving the same about.

Figure 4 is an enlarged rear view of one corner of the truck bed, illustrating more in detail the platform construction. This view is taken on line 4—4 of Figure 1.

Figure 5 is an end view of the platform, taken on line 5—5 of Figure 4, illustrating how the same is supported by a special bracket which is rotatably mounted on a supporting pedestal.

Figure 6 is a fragmentary plan sectional view, taken on line 6—6 of Figure 5, parts broken away for convenience of illustration.

Figure 7 is a sectional view, taken on line 7—7 of Figure 5, illustrating how the bracket mounted to the pedestal supports the platform.

Figure 8 is a perspective view of the bracket removed from the platform and pedestal, other parts also being removed.

Figure 1:
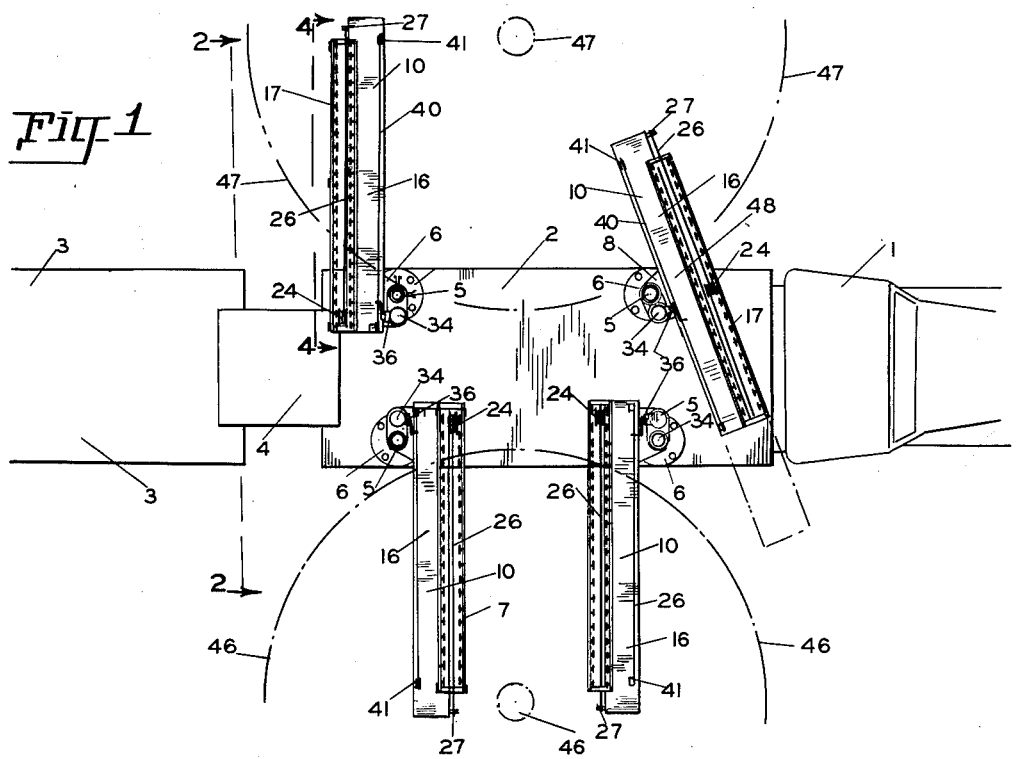

Referring more specifically to the drawings:

I have illustrated a truck 1 with a flat body bed 2 and trailing a flat top trailer 3. A platform 4 connects the truck and trailer platforms, best illustrated in Figure 1. Vertical pedestals 5 are mounted to the platform 2 of the truck by way of footings 6, which are bolted or otherwise secured to the platform.

Figure 2:
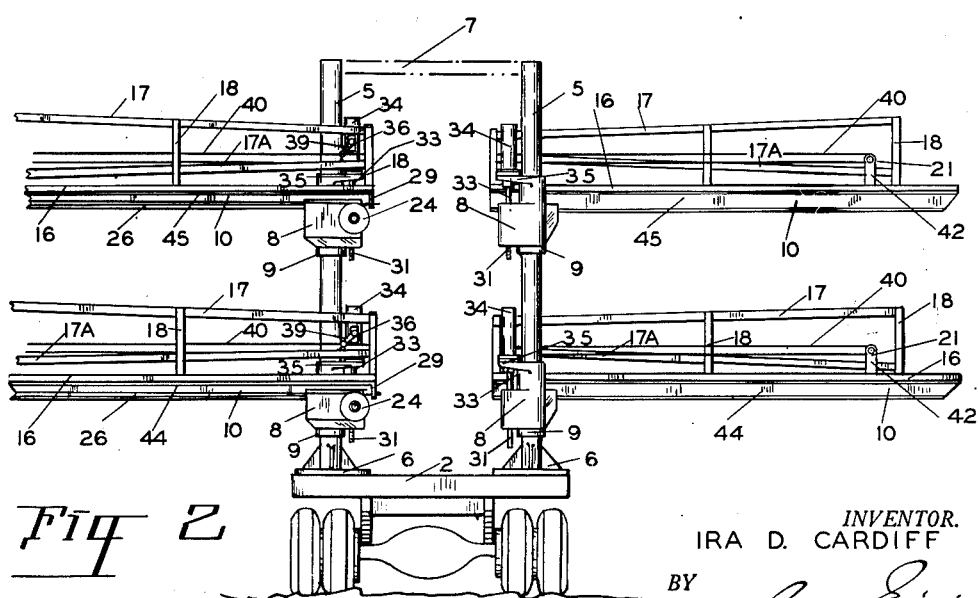
Figure 2 is a rear view of the truck and platforms, taken on line 2—2 of Figure 1.

Referring to Figures 1 and 2, I have illustrated braces by broken lines 7 for tieing the upper ends of the pedestals together. I have illustrated the same by broken lines so as not to cover up more important features of the drawing. A special bracket 8, referring particularly to Figures 5, 6, 7 and 8, is rotatably mounted to the pedestals 5 and positioned thereon by adjustable collars 9.

The platforms consist of booms 10, as for instance I-beams which are supported by the trunnion wheels 11 and 12. The trunnion wheels 11 are journalled to the stub shaft 13, fixedly mounted within the jaw 14 of the bracket 8. The upper trunnion wheels run on the upper surface of the flange 15 of the I-beam, while the lower trunnion wheels run underneath the said flange 15. These trunnion wheels will support the boom in a longitudinal position regardless of the position of the boom relative to the bracket 8.

Walkways 16 are fixedly mounted to the upper surface of the booms 10 and provide support for the picker while picking the fruit. Roller conveyors 17 and 17A are mounted to the walkway or platforms by supporting brackets 18, which are secured to the platform by any suitable means, as for instance bolts 19. Empty boxes are placed on the conveyor 17 at 20 from where they roll down over the conveyor to the point 21. The picker can remove the boxes from any point along the conveyor when a number of boxes have been placed on the conveyor.

When the picker is picking he places the box on the upper conveyor 17 as indicated by broken lines, and picks the fruit directly into the box. After the box has been filled, he releases the same and it travels down the inclined conveyor 17 to the point 22 where it is stopped in its forward movement by the upper ends 23 of the brackets 18, from where it will be removed by a workman located on the bed of the truck, which will be more fully described later.

In order to move the platform units from the platform of the truck into the branches of the trees or return the same, a cable drum 24 is keyed to the shaft 25, which is journalled within suitable bearings within the bracket 8. A cable 26 is dead ended to the bracket 27 forming part of the boom 10, then wrapped about the drum 28 several turns and dead ended to the bracket 29 forming part of the boom 10 at 30. The drum 24 is revolved in either direction by the action of the rack 31 and the pinion 32. The rack 31 forms part of the piston rod 33 of the air cylinder 34, the said air cylinder is mounted to the platform 35 forming part of the bracket 8. The cable 26 is wrapped around the drum, which has non-slip grooves formed therearound, the cable is maintained taut by the springs 26A, further preventing slippage of the cable on the drum.

An air control valve 36 receives its supply of air through the air supply line 37 from a tank and compressor not here shown, but it would be mounted somewhere on the truck. The valve 36 is of a design so as to deliver air from the supply line 37 to either the top or the bottom of the cylinder 34 by way of the manifolds 38. The said valve is operated by the lever 39 by way of an operating cable 40. The cable 40 runs throughout the length of the platform and is supported by the idler pulleys 41, which in turn are supported from the platform by brackets 42.

The operating arm 39 is fixedly secured at 43 to one of the cable runs, and in operation the picker grasps the cable, moving it in the desired direction to control the valve admitting air into either the top or bottom of the cylinder 34, which will govern the movement of the piston rod 33 and the rack 31, pinion 32 and the cable drum 24. As the platform moves in either direction, the cable will remain stationary but running freely over the rollers 41 without moving the arm 39.

Referring to Figure 2, it will be noted that I show platforms 44 mounted relatively low, while I show platforms 45 mounted relatively high. The object, of course, is to be able to pick the fruit from both the lower part of the tree and the uppermost part of the tree. The platforms are adjustable up and down by changing the positions of the supporting collars 9 on the pedestals 5.

In the operation of my new and improved picking or pruning platforms, the truck is driven between the rows of trees. In Figure 1 I illustrate the position of the trees by broken lines 46 and 47. The platform indicated by numeral 48 illustrates how the said platforms are projected into the confines of the tree branches. They can be withdrawn from the branches by the picker by simply grasping the control cable 40, moving the valve control lever 39 to the desired position to rotate the cable drum 28, which reels and unreels the cable 26, pulling the boom 10 either in or out in relation to the truck or the tree.

The picker can grasp the branches of the tree and pivot the platform about the pedestals 5 to any angle before entering the platform into the foliage of the trees. Each picker controls his individual platform. As stated before, as the fruit is picked the boxes are filled on the conveyor 17 and allowed to roll to the position 22. A workman can remove these boxes from the lower platforms 44 and place them on the trailer 3 without any means of elevation but from the upper platforms 45. He will probably have a lifting and lowering platform of any suitable conventional type, not here shown. He also places the empty boxes on the conveyor 17A at the point 20.

In the operation of the platforms, there are four pickers working in half of each tree between which the truck is being operated, and as stated above, each picker is in control of the position of his individual platform.

By the use of my new fruit picking platforms, trained pickers can be employed who will put the fruit directly in the boxes on the platform, eliminating loss of the fruit by bruising and so forth in the packing operation. When the platforms are not being used for picking or pruning they are withdrawn on to the truck as illustrated in Figure 3, making it a simple matter to transport the same over the highway or between the trees.

What I claim is:

1. A mobile fruit picker including a body platform, a standard mounted on the body platform, a rotatable bracket adjustably mounted on the body platform, including a horizontal guideway, a beam slidably mounted on the guideway, a walkway supported on the beam, a shaft mounted on the bracket, means carried by the bracket for operating the shaft, a drum on the shaft, a cable fastened at one end to the beam, thence around the pulley, and fastened at the other end to the opposite end of the beam, and means on the walkway extending the full length of said walkway to control the operation of the operating means.

2. A mobile fruit picker including a body platform, a nested series of standards mounted on the body platform, upper and lower brackets rotatably mounted on each standard, a slidable walkway mounted on each bracket, a pair of conveyors mounted on each walkway, means associated with each walkway to slide said walkway and conveyors toward and away from its supporting standard, and means extending the length of each walkway to control the sliding movement of the walkway, whereby the walkways can be extended from the body platform when in use or folded together longitudinally side by side on the body platform.

3. A mobile fruit picker, including a body platform, a standard mounted on the body platform, a rotatable bracket adjustably mounted on the body platform including a horizontal guideway, a beam slidably mounted on the guideway, a walkway supported on the beam, a shaft mounted on the bracket, a pinion on the shaft, a cylinder on the bracket, a piston rod operating in the piston and having teeth to engage the pinion, a valve to control the movement of the piston rod in the cylinder, a drum on the shaft, a cable fastened at one end to the beam, thence around the drum and fastened at the other end to the opposite end of the beam, and means on the walkway extending the full length of said walkway to control the valve to advance or retract the beam and walkway.

4. A mobile fruit picker, comprising a platform, a standard rising from the platform, a bracket adjustably vertically mounted and freely rotatable on the standard, a cylinder mounted on the bracket, a piston rod operating in the cylinder, the piston rod having a series of teeth, a shaft mounted in the bracket at right angle to the piston rod, a pinion on the shaft meshing with the teeth on the piston rod, a drum on the shaft, a valve having a handle, a beam and walkway slidably mounted in guides formed in the bracket, a cable attached at one end of the beam, thence trained around the drum and secured at its opposite end to the opposite end of the beam, a pair of spaced-apart conveyors supported on the walkway, the lower conveyors inclining outwardly and downwardly from the standard and the upper conveyor inclining upwardly and downwardly from the standard when the walkway is extended outwardly in fruit-picking position, and means extending the full length of the walkway and connected to the valve handle to control the movement of the piston rod.

IRA D. CARDIFF.

REFERENCES CITED

The following references are of record in the file of this patent:

UNITED STATES PATENTS

| Number | Name | Date |
|---|---|---|
| 1,558,014 | Jaenicke | Oct. 20, 1925 |
| 1,960,355 | Tamini | May 29, 1934 |
| 2,321,387 | Jackson | June 8, 1943 |
| 2,428,184 | Swindler | Sept. 30, 1947 |
| 2,450,152 | Miller | Sept. 28, 1948 |
| 2,450,812 | Ray | Oct. 5, 1948 |
| 2,564,020 | Mengel | Aug. 14, 1951 |